(12) United States Patent
Lingafelt et al.

(10) Patent No.: US 9,392,019 B2
(45) Date of Patent: Jul. 12, 2016

(54) MANAGING CYBER ATTACKS THROUGH CHANGE OF NETWORK ADDRESS

(71) Applicant: LENOVO Enterprise Solutions (Singapore) PTE, LTD., New Tech Park (SG)

(72) Inventors: Charles S. Lingafelt, Durham, NC (US); James W. Murray, Durham, NC (US); James T. Swantek, Canton, GA (US); James S. Worley, Raleigh, NC (US)

(73) Assignee: LENOVO ENTERPRISE (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/444,345

(22) Filed: Jul. 28, 2014

(65) Prior Publication Data

US 2016/0028765 A1 Jan. 28, 2016

(51) Int. Cl.
*H04L 29/06* (2006.01)
*H04L 29/12* (2006.01)

(52) U.S. Cl.
CPC ........ *H04L 63/1458* (2013.01); *H04L 61/2015* (2013.01); *H04L 61/2053* (2013.01)

(58) Field of Classification Search
CPC .. H04L 63/1458; H04L 63/14; H04L 61/2015
USPC ............................................. 726/22, 23, 24
See application file for complete search history.

(56) References Cited

U.S. PATENT DOCUMENTS

| | | | |
|---|---|---|---|
| 7,136,922 B2 | 11/2006 | Sundaram et al. | |
| 7,161,897 B1 | 1/2007 | Davies et al. | |
| 7,925,787 B2 | 4/2011 | Grandmaitre | |
| 8,060,939 B2 | 11/2011 | Lynn et al. | |
| 8,176,527 B1 * | 5/2012 | Njemanze et al. | 726/2 |
| 8,245,294 B1 | 8/2012 | Zahra et al. | |
| 8,280,968 B1 | 10/2012 | Duan | |
| 8,612,279 B2 | 12/2013 | Moon et al. | |
| 8,613,089 B1 * | 12/2013 | Holloway et al. | 726/23 |
| 8,627,447 B1 * | 1/2014 | Chickering | H04L 63/0263 726/11 |
| 2002/0161884 A1 * | 10/2002 | Munger et al. | 709/224 |
| 2002/0174208 A1 * | 11/2002 | Morlitz | 709/223 |
| 2005/0273673 A1 * | 12/2005 | Gassoway | 714/45 |
| 2007/0214267 A1 * | 9/2007 | Ogura | G06F 21/566 709/226 |

(Continued)

OTHER PUBLICATIONS

Henry et al., "Mobile Devices on IP Internetworks," International Journal of Computer Science Issues, May 2012, p. 496-504, vol. 9, Issue 3, ISSN.

(Continued)

*Primary Examiner* — Sarah Su
(74) *Attorney, Agent, or Firm* — Kunzler Law Group; Katherine S. Brown (57) ABSTRACT

A system for responding to a cyber-attack on a server. A notification is sent to a server administrator that a cyber-attack is occurring and the number of cyber-attacks on the server has exceeded a predetermined threshold. A request is received by a server, from the server administrator, in response to receiving the notification, to obtain a new Internet Protocol (IP) address for the server. The new IP address will be generated following a protocol received by the server from the server administrator. In response to receiving instructions to follow a protocol from the server administrator, the server requests a new IP address from a DHCP system. The DHCP system will obtain a new IP address for the server following the protocol sent by the server to the DHCP system.

20 Claims, 4 Drawing Sheets

(56) References Cited

U.S. PATENT DOCUMENTS

| | | | |
|---|---|---|---|
| 2008/0059615 A1 | 3/2008 | Izutani | |
| 2011/0138081 A1* | 6/2011 | Matsuda | H04L 29/1232 709/250 |
| 2011/0161786 A1* | 6/2011 | Nishiyama | 714/776 |
| 2012/0311184 A1* | 12/2012 | Yamada | H04L 61/2038 709/245 |
| 2013/0138793 A1 | 5/2013 | Nishioka | |
| 2014/0359749 A1* | 12/2014 | Rieke | H04L 63/02 726/11 |
| 2014/0373138 A1* | 12/2014 | Park et al. | 726/22 |
| 2015/0026806 A1* | 1/2015 | Lingafelt et al. | 726/23 |
| 2015/0042792 A1* | 2/2015 | Krischer et al. | 348/143 |

OTHER PUBLICATIONS

Lingafelt et al, "Mitigating a Cyber-Security Attack by Changing a Network Address of a System Under Attack," Filed on Jul. 18, 2013, p. 1-24, U.S. Appl. No. 13/945,409.

Pappas et al., "Mobile Host Location Tracking through DNS," University College London, BTexact Technologies. 2002.

Tinnel et al., "Cyberwar Strategy and Tactics," Proceedings of the 2002 IEEE, Jun. 2002, p. 228-234, Workshop on Information Assurance.

* cited by examiner

MANAGING CYBER ATTACKS THROUGH CHANGE OF NETWORK ADDRESS

BACKGROUND OF THE INVENTION

The present invention relates generally to the field of computer network security, and more particularly to monitoring a system for intrusion and changing a network address to mitigate the intrusion.

The Internet Protocol version 4, or IPv4, is the defined standard internet protocol (IP) in the world today, but it is being replaced by the more advanced IPv6, to help solve IP address exhaustion, or the unavailability of free IP address, due to the limited amount of available addresses under IPv4 at any one time. IPv4 uses 32 bits to define each address, which, in total, allows for roughly four billion possible addresses. During the inception of IPv4 in 1981 the amount of available address in a 32 bit system did not seem limiting, however, with the amount of devices accessing the internet always increasing, IP address exhaustion has become an issue. IPv6 uses 128 bits for each address. An IPv6 address consists of 128 bits, therefore allowing for a significantly larger amount of possible IP addresses. Under the 128 bit IPv6 protocol there are $2^{128}$ or roughly $3.4 \times 10^{38}$ available addresses as opposed to the $4.3 \times 10^9$ available addresses under IPv4.

The limited number of available IP address under IPv4 may make computer devices using IPv4 vulnerable to cyber-security attacks. One example that is prevalent is a Denial-of-Service (DoS) or Distributed DoS (DDoS) attack. In a DoS attack, an attacker bombards a victim network or server with a large volume of message traffic. Handling this traffic consumes the victim's available bandwidth, CPU capacity, or other system resources, and eventually brings the victim to a condition in which it is unable to serve its legitimate clients. A DDoS attacks can be even more damaging, as they involve creating overwhelming additional network traffic from multiple sources simultaneously. This may be called a zombie, or botnet, attack. A DDoS attack may occur when an attacker attempts to control a large number of devices on a network by using malicious programs that self-replicate across the network by exploiting security flaws in widely-used services.

SUMMARY

Embodiments of the present invention disclose a method, computer program product, and system for responding to a cyber-attack on a server. A notification is sent to a server administrator that a cyber-attack is occurring and the number of cyber-attacks on the server has exceeded a predetermined threshold. A request is received by a server, from the server administrator, in response to receiving the notification, to generate a new Internet Protocol (IP) address for the server. The new IP address will be generated following a protocol indicated by the server from the server administrator. In response to receiving instructions to follow a protocol from the server administrator, the server requests a new IP address from an IP address providing server. The IP address providing server will obtain a new IP address for the server following the protocol indicated by the server to the IP address providing server.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
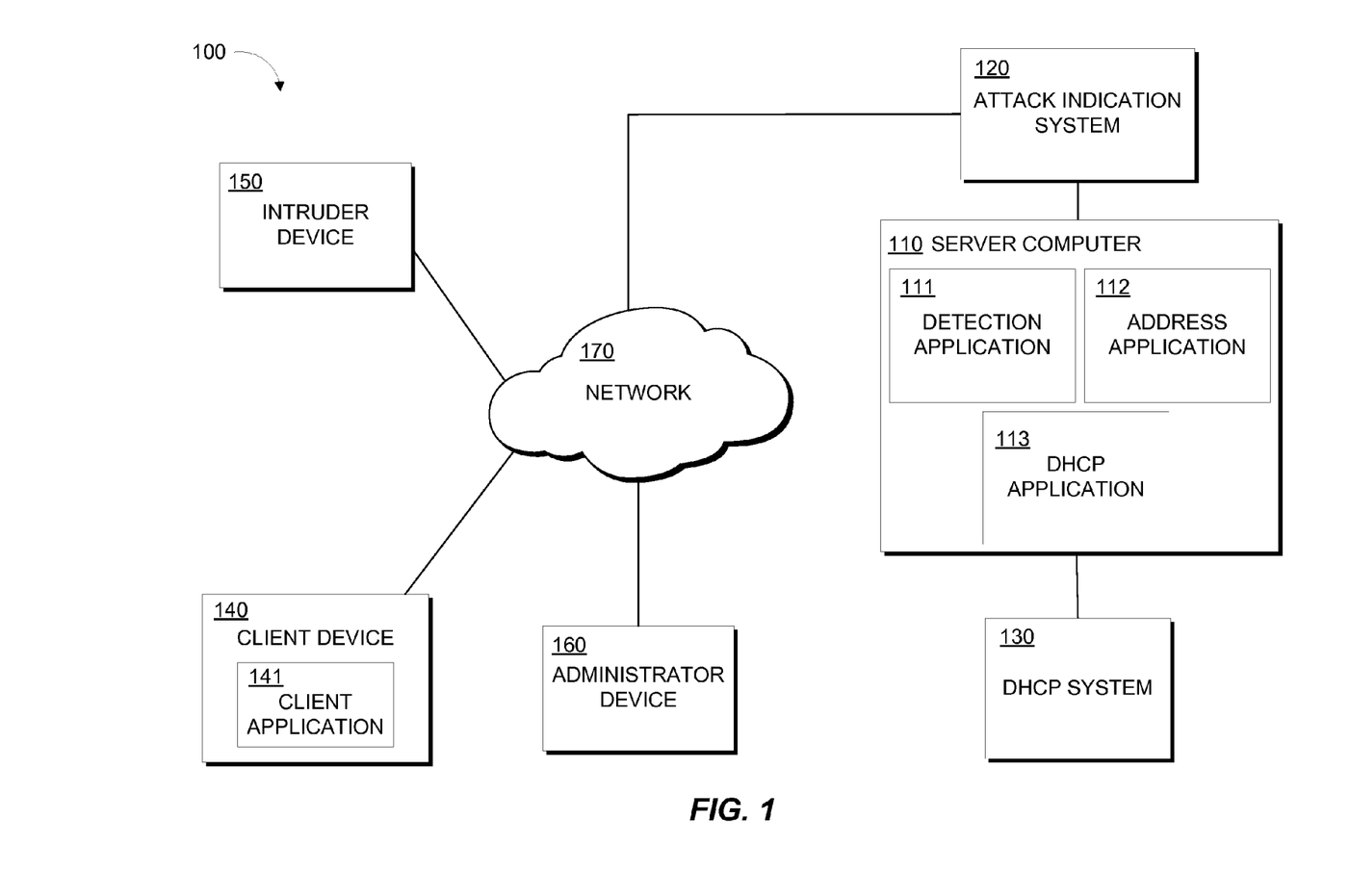
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Data processing environment 100 includes server computer 110, attack indication system 120, DHCP system 130, client device 140, intruder device 150, and administrator device 160 where all may be interconnected over network 170.

Network 170 may include permanent connections, such as wire or fiber optic cables, or temporary connections made through telephone or wireless communications. Network 170 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 170 can be, for example, a local area network (LAN), a wide area network (WAN) such as the Internet, or a combination of the two, and can include wired, wireless, or fiber optic connections. In general, network 170 can be any combination of connections and protocols that will support communications between server computer 110, client device 140, intruder device 150, and administrator device 160.

Figure 4:
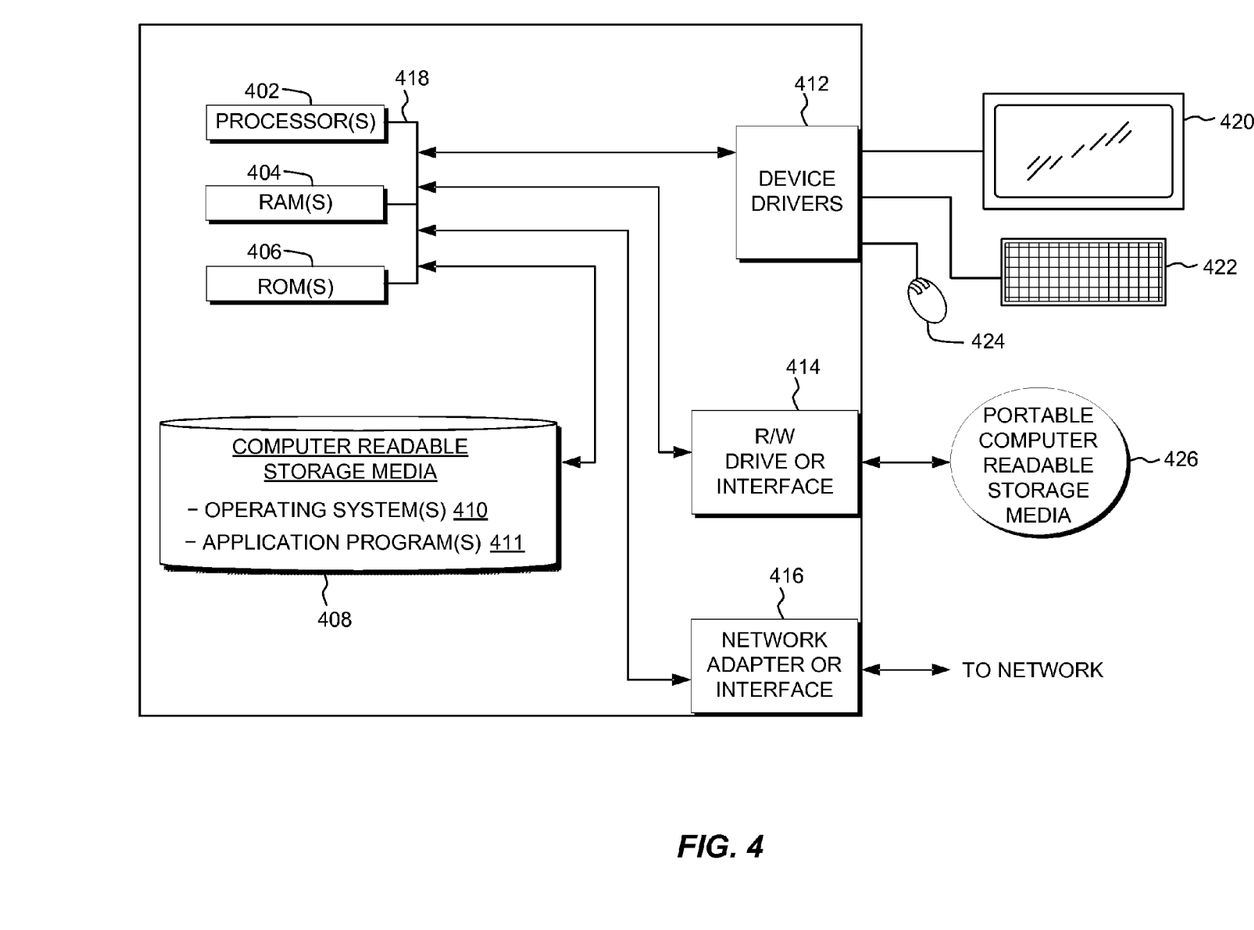
FIG. 4 depicts a block diagram of components of a computing device, in accordance with an embodiment of the present invention.

Server computer 110, attack indication system 120, DHCP system 130, client device 140, intruder device 150, and administrator device 160 may be a laptop computer, tablet computer, netbook computer, personal computer (PC), a desktop computer, a smart phone, or any programmable electronic device capable of an exchange of data packets with other electronic devices, for example, through a network adapter, in accordance with an embodiment of the invention, and which may be described generally with respect to FIG. 4 below.

Intruder device 150 may be a source of a cyber-security attack on server computer 110, for example, a DDoS attack on server computer 110. Intruder device 150, for example, may include one or more computing devices that execute an application that sends continuous message traffic to server computer 110 for the purpose of participating in a DDoS attack on server computer 110.

Attack indication system 120 may act generally as an attack detection mechanism for detecting an attack by, for example, intruder device 150. Attack indication system 120 may include, for example, a network intrusion application, for example a firewall detector. Attack indication system 120 may be external to server computer 110, for example, an application on a router or network card, or internal, as an additional application on server computer 110.

In various embodiments of the invention, attack indication system 120 may be implemented using any method, apparatus, computer program, or system that is configured for indicating that an endpoint device, for example server computer 110, is under attack, for example, host based intrusion detection, network-based intrusion detection, or boundary device detection. Host-based intrusion detection uses a monitoring program, running on the endpoint device itself that may observe devices that may attempt to compromise the endpoint device. For example, server computer 110 may be the endpoint device and intruder device 150 may be attempting to compromise server computer 110. Network-based intrusion detection uses a monitoring program, running within a network, for example network 170, to which one or more endpoint devices may be connected, and may conduct observations to identify whether network traffic destined for a particular IP address associated with a specific endpoint device is traffic that is of an attacking nature. Boundary device detection uses a monitoring component in a boundary mechanism, such as a firewall, to observe traffic destined for a specific endpoint, and to identify any such traffic that is suspected to be malicious.

Client device 140 may act generally to host an application, for example, client application 141. In various embodiments of the invention, client application 141 may act generally to receive input from a user, display data in a GUI, or communicate over a network via, for example, a web browser. Client application 141 may be able to communicate with server computer 110 over network 170. Client application 141 may receive messages or notifications from server computer 110, as described below, in accordance with an embodiment of the present invention.

Administrator device 160 may act generally to receive input from an administrative user. Administrator device 160 may configure attack indication system 120 with a predetermined threshold in attack intensity where, if crossed, administrator device 160 may receive a message from attack indication system 120 that an attack is underway and exceeding the predetermined threshold. Administrator device 160 may establish IP ranges for DHCP System 130, set up periods of validity for each IP address, and determine methods for changing the IP address of server 110 when an attack has occurred, as described in further detail below.

Attack indication system 120 may detect an attack that crosses the predetermined threshold and, in response, send a message to, for example, administrator device 160 that an attack is occurring. Attack indication system 120 may also send a message to server computer 110 that an attack is occurring.

Server computer 110 includes detection application 111, address application 112, and DHCP application 113. In various embodiments of the invention, server computer 110 operates generally to host a server application, for example, detection application 111, that may, for example, receive messages from attack indication system 120 of an attack and send messages in response to the attack. Detection application 111 may be, for example, database oriented, computation oriented, or a combination of these. Detection application 111 may receive a message from attack indication system 120 that an attack is occurring. Detection application 111 may communicate with address application 112 to request a new IP address for the endpoint device under attack. In various embodiments of the invention, detection application 111 may receive a message from administrator device 160 to drop the current IP address and that a new IP address be selected, according to a series of commands. These commands that initiate a change IP response protocol or "IP change request" may include, for example, ReleaseRequestNew, ReleaseRequestRandom, ReleaseRequestOrdered, or ReleaseRequestLeastRecent. The IP change request may be selected by administrator device 160, predetermined by a developer when programming, for example, detection application 111, selected automatically based on the efficiency or computer resource use the method may utilize, or randomly selected.

Address application 112 may act generally to send and receive IP change requests, store IP address stacks and predetermines address ranges, and processes received IP addresses from DHCP application 113, as described below. Address application 112 may receive an IP change request from detection application 111.

Address application 112 may communicate with DHCP application 113, to enact an IP change request. DHCP application 113 may send an IP change request to DHCP system 130 to drop the current IP address and select a new IP address. DHCP application 113 may receive a new IP address from DHCP system 130. DHCP application 113 may apply a time in which the IP address will be valid or "lease time", as predetermined by administrator device 160. The lease time may have an associated start time, for example, a timestamp when DHCP application 113 receives the IP address from DHCP system 130, and an end time or expiration. In various embodiments of the invention, DHCP application 113 may request a new IP address automatically at the end of the previous lease time or may send a message to, for example, administrator device 160 or address application 112, that the IP address is expired and a new IP change request, from for example, administrator device 160, may be sent to DHCP system 130.

DHCP system 130 may be a server or a bank of servers and may act generally as a database or data store of available IP addresses and configuration information. In various embodiments of the invention, DHCP system 130 may an internal component or application within server computer 110. DHCP system 130 may receive an IP change request, for example, DHCP application 113. In response to the drop request, the DHCP system 130 may determine a network, for example network 170, to which server computer 110 is connected, and may allocate an IP address or prefix that is appropriate for the server computer 110 in one of the exemplary methods described below. DHCP system 130 may send configuration information to DHCP application 113. The DHCP system 130 may grant and transmit an IP addresses to DHCP application 113 only for a limited interval of time or lease time. DHCP system 130 may use IPv4 or IPv6, although there may be a different version of DHCP system 130 that uses IPv4, IPv6, or another Internet Protocol version. In various embodiments, DHCP system 130 using IPv6 may use stateless address auto configuration to obtain a newly assigned IP address. In alternative embodiments, DHCP system 130 using IPv4 may use link-local addressing to obtain a newly assigned IP address that is used to achieve limited local connectivity.

Given that attack indication system 120 has determined that an attack on server computer 110 is occurring and the attack intensity has exceeded a predetermined threshold, then the IP address of server computer 110 may be changed according to embodiments of the present invention, from a currently assigned IP address to a newly assigned IP address. Exemplary embodiments may effectuate the change of IP address using a request commands, for example, ReleaseRequestNew, ReleaseRequestRandom, ReleaseRequestOrdered, or ReleaseRequestLeastRecent.

In an exemplary embodiment, administrator device 160 may receive a message from attack indication system 120 that server computer 110 is under attack. Administrator device 160 may display a DHCP option field to a user based on the received message. Administrator device 160 may receive instructions to display the various IP change request as options to determine which response protocol to follow or "DHCP options". Administrator device 160 may receive user input selecting one of the DHCP options, to request a new address that is not the same as any previously used address. This may be embodied in a request command, for example, ReleaseRequestNew. Detection application 111 may receive IP change request command ReleaseRequestNew. Detection application 111 may communicate the ReleaseRequestNew command to DHCP application 113 and DHCP application 113 may communicate the ReleaseRequestNew command to DHCP system 130. The ReleaseRequestNew command may instruct DHCP system 130 to query the configuration file in DHCP system 130 to find a free IP addresses in an IP address block, for example, block 1 associated with server computer 110 that is not the same as any IP address previously used by server computer 110, and provide the new IP address from the associated IP address block 1 back to DHCP application 113, via server computer 110, and mark the new address as "in use" in the address block.

In another exemplary embodiment, administrator device 160 may receive a message from attack indication system 120 that server computer 110 is under attack. Administrator device 160 may display DHCP options to a user. Administrator device 160 may receive input from a user selecting a DHCP option to request a new address at random. This may be embodied in a request command, for example, ReleaseRequestRandom. Detection application 111 may communicate the ReleaseRequestRandom command to DHCP application 113 and DHCP application 113 may communicate the ReleaseRequestRandom command to DHCP system 130. The ReleaseRequestRandom command may instruct DHCP system 130 to query the configuration file in DHCP system 130 to find an IP address in, for example block 2, associated with server computer 110 and randomly select an unused address from the IP address block 2. DHCP system 130 may communicate the new IP address from the associated IP address block 2 back to DHCP application 113, via server computer 110 and mark the new address as "in use" in the address block.

In another exemplary embodiment, administrator device 160 may receive a message from attack indication system 120 that server computer 110 is under attack. Administrator device 160 may display DHCP options to a user. Administrator device 160 may receive input from a user selecting a DHCP option to request a new address from an ordered list. This may be embodied in a request message, for example, ReleaseRequestOrdered. Detection application 111 may communicate the ReleaseRequestOrdered command to DHCP application 113 and DHCP application 113 may communicate the ReleaseRequestOrdered command to DHCP system 130. The ReleaseRequestOrdered command may instruct DHCP system 130 to query the configuration file of DHCP system 130 to find an IP address in, for example, block 3, associated with server computer 110. DHCP system 130 may establish a list of IP addresses in memory. The list may be ordered, for example, in ascending or descending numerical value. A pointer may be established in the list to refer to an IP address not in use. DHCP system 130 may obtain the current pointer from memory and use the pointer to obtain the associated IP address. DHCP system 130 may provide back the obtained IP address to DHCP application 113, via server computer 110. DHCP system 130 may increment the pointer to the next IP address not in use in the ordered list. DHCP system 130 may mark the obtained IP address as "in use".

In another exemplary embodiment, administrator device 160 may receive a message from attack indication system 120 that server computer 110 is under attack. Administrator device 160 may display DHCP options to a user. Administrator device 160 may receive input from a user selecting a DHCP option to request a new address that is least recently used. This may be embodied in a request command, for example, ReleaseRequestLeastRecent. Detection application 111 may communicate the ReleaseRequestLeastRecent command to DHCP application 113 and DHCP application 113 may communicate the ReleaseRequestLeastRecent command to DHCP system 130. The ReleaseRequestLeastRecent command may instruct DHCP system 130 to query the configuration file in DHCP system 130 to find an IP address in, for example block 4, associated with server computer 110. DHCP system 130 may create a list in memory of unused IP addresses, for example, from least recently used to most recently used. The least recently used order may be, for example, the least recently used by the server or the least recently used by any device with an IP address monitored by DHCP system 130 on network 170. DHCP system 130 may obtain an address from the top of the order or the least recently used address. DHCP system 130 may provide back to DHCP application 113, via server computer 110 the least recently used IP address from block 4 associated with server computer 110 and mark the new address as "in use".

Address application 112 may receive a newly assigned IP address from DHCP application 113 and store the address in memory. When address application 112 receives a new IP address, address application may communicate a message to administrator device 160 and all client devices, for example client device 140, that a new IP address has been obtained. In various embodiments of the invention the address application 112 may send a message to client application 141 to refresh, for example, to restart the web browser or refresh the web page in communication with server computer 110.

Figure 2:
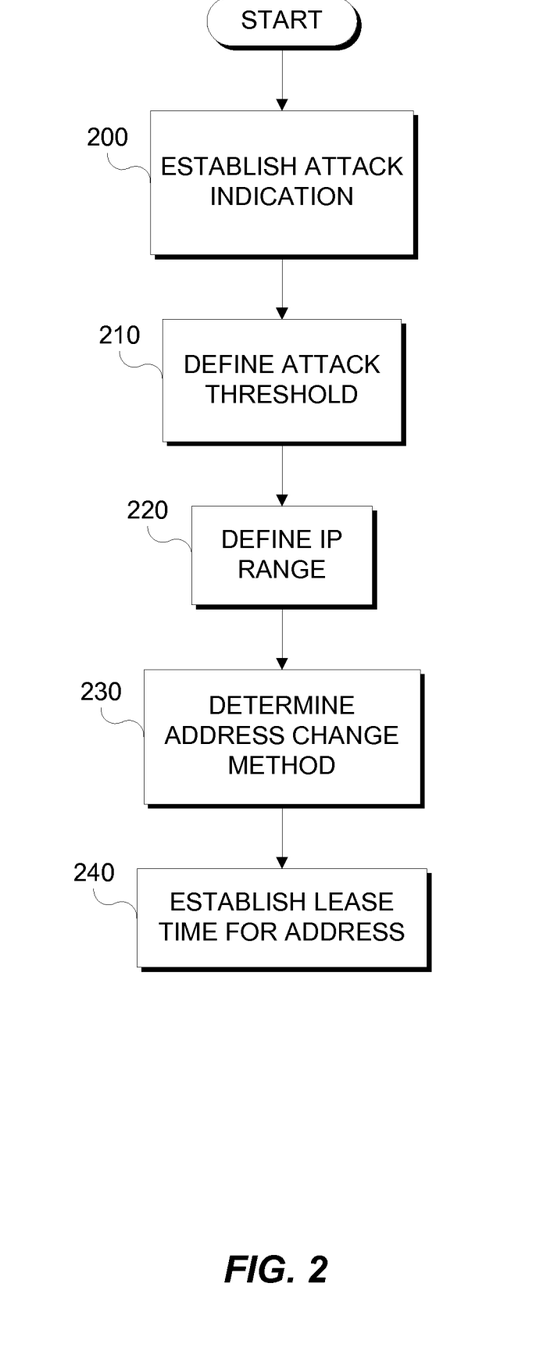
FIG. 2 is a flowchart depicting operational steps of preparing a server computer within the data processing environment of FIG. 1, for detecting and mitigating a cyber-security attack.

FIG. 2 is a flowchart depicting operational steps of preparing server computer 110, within the data processing environment of FIG. 1, for detecting and mitigating a cyber-security attack, in accordance with an embodiment of the present invention. Referring now to FIGS. 1 and 2, administrator device 160 receives input from a user or developer that establishes, selects, or defines an attack indicator (step 200). This step may be performed, for example, by administrator device 160 instructing the attack indication system 120 to monitor or sense one or more parameters that are indicative of a cyber-attack. These one or more parameters may be related to host based intrusion detection, network-based intrusion detection, boundary device detection, or external-to-organization security attack intelligence information.

Administrator device 160 receives a user or developer defined attack threshold (step 210). The threshold is predetermined as one or more of the parameters established by the user or developer in step 200. The threshold may be, for example, the number of attacks per unit time, a level of network traffic, or a level of server resources being consumed per unit time.

Administrator device 160 receives a user or developer defined range of IP addresses (step 220). The IPv4 or IPv6 address block is arranged into subnets by separating the network portion and the subnet portion of the IP address from the host identifier portion of the IP address. This is performed by a bitwise "AND" operation between the IP address and the subnetwork mask. The result yields the network address or prefix, and the remainder is the host identifier. A subnet may consist of address ranges between more than one block. Administrator device 160 receives user or developer designated addresses, within the subnet range, for one or more attack response IP address change series of commands. For example, each of ReleaseRequestNew, ReleaseRequestRandom, ReleaseRequestOrdered, and ReleaseRequestLeastRecent, may have an associated range of IP addresses for use.

Server computer 110 receives programming instructions from a user or developer, in order to perform one or more of the IP change requests (step 230). Administrator device 160 receives instructions from a user or developer to recognize a message that an attack is occurring and in response to that message display an option to choose one more IP change requests that instruct server computer 110 to obtain a new IP address. The IP change requests can be selected various ways, for example, expressly by a user when an attack is detected, predetermined so that the new IP addresses is obtained automatically, selected at random by detection application 111, or a method may be selected based on efficiency or server resources at the time of the attack. A time period or "lease time" is established for how long new IP addresses will be valid (step 240).

Although, in the flowchart description of FIG. 2 above, various devices receive programming instructions from a user or developer, this is only meant to represent an example. Programming instructions and related data may also be generated by a computing device such that the instructions are execute on a computing device within environment 100 (FIG. 1).

Figure 3:
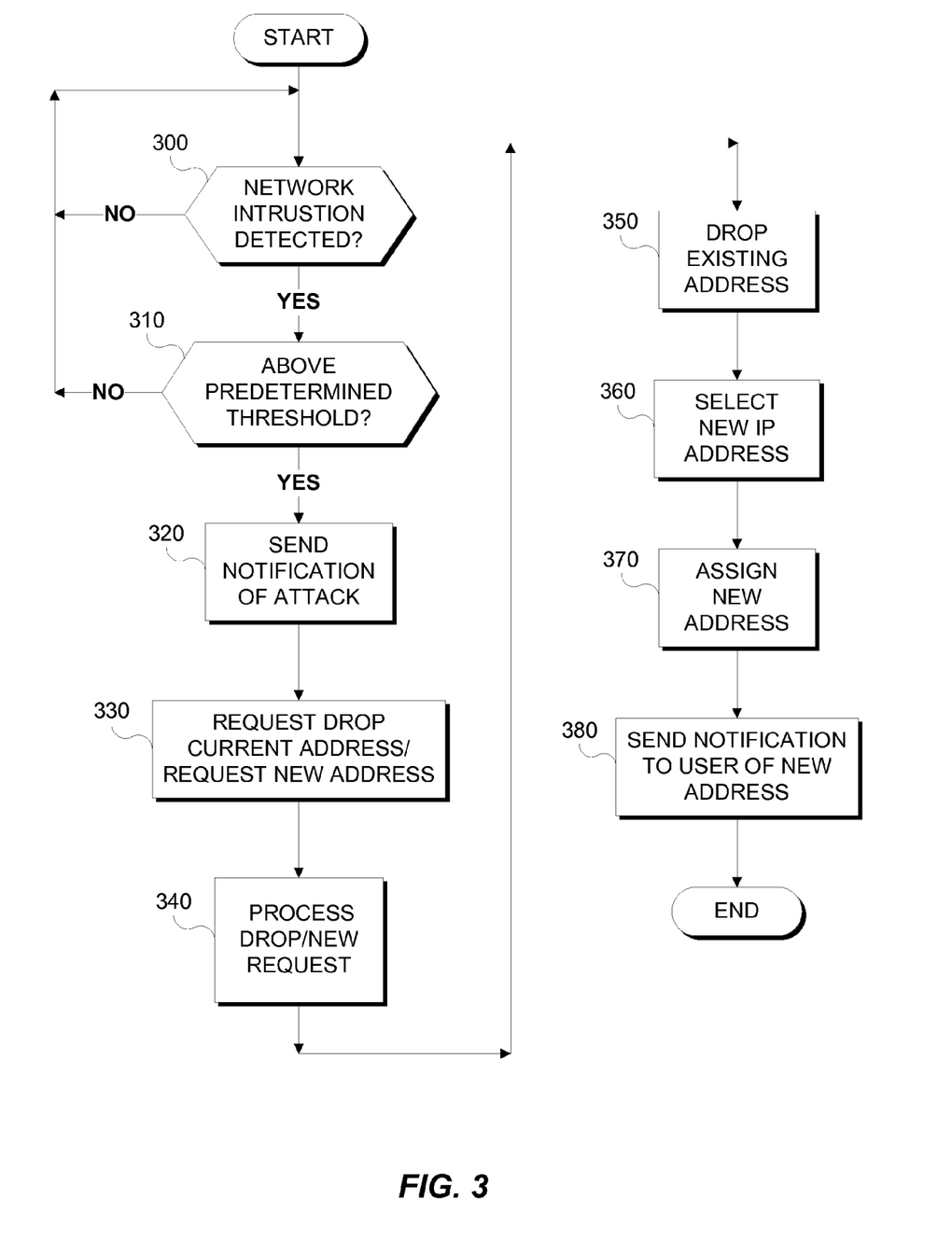
FIG. 3 is a flowchart depicting operational steps of requesting a new IP address, in accordance with an embodiment of the present invention.

FIG. 3 is a flowchart depicting operational steps of requesting a new IP address, in accordance with an embodiment of the present invention. Referring now to FIGS. 1 and 3, if attack indication system 120 detects a network intrusion (decision step 300) and the intrusion detected by attack indication system 120 (decision step 300 "YES" branch) has crossed a predetermined threshold (decision step 310 "YES" branch) attack indication system 120 sends a notification to, for example, administrator device 160 (step 320) informing administrator device 160 that an attack is occurring.

In addition to the notification sent by attack indication system 120 to administrator device 160 (step 320) instructions to display options to select a response protocol to change the IP address or "IP change request" are sent to administrator device 160. Detection application 111 receives an IP change request from administrator device 160 instructing detection application 111 to implement a response protocol to change the IP address via ReleaseRequestNew, ReleaseRequestRandom, ReleaseRequestOrdered, or ReleaseRequestLeastRecent (step 330).

DHCP application 113 receives the IP change request from detection application 111 and passes the request to DHCP system 130 (step 340). DHCP system 130, following one of the response protocols, drops the existing IP address (step 350) and selects a new IP address from a block of addresses associated with server computer 110 (step 360).

DHCP system 130 provides back the newly selected IP address to DHCP application 113 (step 370), via server computer 110. DHCP application 113 passes the newly selected IP address to address application 112 to be stored. A notification that a new IP address has been obtained is sent to client device 140 and administrator device 160, from address application 112 (step 380).

FIG. 4 depicts a block diagram of components of server computer 110, attack indication system 120, DHCP system 130, client device 140, intruder device 150, or administrator device 160 in distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server computer 110, attack indication system 120, DHCP system 130, client device 140, intruder device 150, or administrator device 160 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, detection application 111 and address application 112, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server computer 110, attack indication system 120, DHCP system 130, client device 140, intruder device 150, or administrator device 160 may also include a R/W drive or interface 414 to read from and write to one or more portable computer readable storage media 426. Application programs 411 on server computer 110, attack indication system 120, DHCP system 130, client device 140, intruder device 150, or administrator device 160 may be stored on one or more of the portable computer readable storage media 426, read via the respective R/W drive or interface 414 and loaded into the respective computer readable storage media 408.

Server computer 110, attack indication system 120, DHCP system 130, client device 140, intruder device 150, or administrator device 160 may also include a network adapter or interface 416, such as a TCP/IP adapter card or wireless communication adapter (such as a 4G wireless communication adapter using OFDMA technology). Application programs 411 on server computer 110, attack indication system 120, DHCP system 130, client device 140, intruder device 150, or administrator device 160 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server computer 110, attack indication system 120, DHCP system 130, client device 140, intruder device 150, or administrator device 160 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method comprising:
   detecting a cyber-attack on a server;
   identifying a number of cyber-attacks on the server per unit of time;
   comparing the number of cyber-attacks per unit of time to a predetermined threshold;
   sending a notification to a server administrator in response to the number of cyber-attacks exceeding the threshold;
   receiving a IP change request from the server administrator, in response to the notification, the IP change request indicating a particular response protocol among a plurality of response protocols for generating a new IP address of the server;
   requesting the new IP address from an IP address providing server according to using the particular response protocol, wherein each response protocol indicates a procedure for selecting a new IP address and a specific range of IP addresses from which to select the new IP address;
   receiving the new IP address from the address providing server;
   identifying a lease time associated with the new IP address from the address providing server, wherein the new IP address is valid for a limited interval of time indicated by the lease time; and
   applying the new IP address for the limited interval of time.

2. The method of claim 1 wherein the requesting the new IP address further comprises:
   instructing the address providing server to drop a currently assigned IP address of the server;
   instructing the address providing server to select the new IP address using the particular response protocol, wherein the new IP address is selected from the range of IP addresses associated with the particular response protocol, wherein receiving the new IP address from the address providing server comprises receiving the selected new IP address from the address providing server.

3. The method of claim 2, further comprising:
   receiving, by the address providing server, a request from the server to drop the currently assigned IP address;
   receiving, by the address providing server, instructions to select the new IP address;
   selecting, by the address providing server, the new IP address; and
   sending, by the address providing server, the new IP address to the server.

4. The method of claim 1, wherein the particular response protocol instructs the address providing server to select an IP address previously unassigned to the server as the new IP address.

5. The method of claim 1, wherein the particular response protocol instructs the address providing server to randomly select the new IP address from among a set of unassigned IP addresses.

6. The method of claim 1, wherein the particular response protocol instructs the address providing server to select a least recently used IP address as the new IP address.

7. The method of claim 1, wherein the response protocol is selected based on server resources at a time of attack.

8. A computer program product for responding to a cyber-attack on a server, the computer program product comprising:
   one or more tangible computer-readable storage media and program instructions executable by a processor of a computer and stored on the one or more computer-readable storage media, the program instructions comprising:
   program instructions to detect a cyber-attack on a server;
   program instructions to identify a number of cyber-attacks on the server per unit of time;
   program instructions to compare the number of cyber-attacks per unit of time to a predetermined threshold;
   program instructions to send, by the processor, a notification to a server administrator in response to the number of cyber-attacks exceeding the threshold;
   program instructions to receive, by the processor, a IP change request from the server administrator, in response to the notification, the IP change request indicating a particular response protocol among a plurality of response protocols for generating a new IP address of the server;
   program instructions to request, by the processor, the new IP address from an IP address providing server using the particular response protocol, wherein each response protocol indicates a procedure for selecting a new IP address and a specific range of IP addresses from which to select the new IP address;
   program instructions to receive the new IP address from the address providing server
   program instructions to identify a lease time associated with the new IP address from the address provide server, wherein the new IP address is valid for a limited interval of time indicated by the lease time; and
   program instructions to apply the new IP address for the limited interval of time.

9. The computer program product in accordance with claim 8, wherein the program instructions to request the new IP address further comprises:
   program instructions to instruct, by the processor, that the address providing server to drop a currently assigned IP address of the server;
   program instructions to instruct, by the processor, the address providing server to select the new IP address using the particular response protocol, wherein the new IP address is selected from the range of IP addresses associated with the particular response protocol, wherein receiving the new IP address from the address providing server comprises receiving the selected new IP address from the address providing server.

10. The computer program product in accordance with claim 9, further comprising:
 program instructions to receive, by the address providing server, a request from the server to drop the currently assigned IP address;
 program instructions to receive, by the address providing server, instructions to select a new IP address;
 program instructions to select, by address providing server, a new IP address; and
 program instructions to send, by address providing server, a new IP address to the server.

11. The computer program product in accordance with claim 8, wherein the particular response protocol instructs the address providing server to select an IP address previously unassigned to the server as the new IP address.

12. The computer program product in accordance with claim 8, wherein the particular response protocol instructs the address providing server to randomly select the new IP address from among a set of unassigned IP addresses.

13. The computer program product in accordance with claim 8, wherein the particular response protocol instructs the address providing server to select the new IP address using a next available IP address in a predetermined ordered list of IP address.

14. The computer program product in accordance with claim 8, wherein the response protocol is randomly selected.

15. A computer system for responding to a cyber-attack on a server, the computer system comprising:
 a computer processor;
 a computer-readable storage media;
 program instructions stored on the computer-readable storage media for execution by the processor, the program instructions comprising:
 program instructions to detect a cyber-attack on a server;
 program instructions to identify a number of cyber-attacks on the server per unit of time;
 program instructions to compare the number of cyber-attacks per unit of time to a predetermined threshold;
 program instructions to send, by the processor, a notification to a server administrator in response to the number of cyber-attacks exceeding the threshold;
 program instructions to receive, by the processor, a IP change request from the server administrator, in response to the notification, the IP change request indicating a particular response protocol among a plurality of response protocols for generating a new IP address of the server;
 program instructions to request, by the processor, the new IP address from an IP address providing server using the particular response protocol, wherein each response protocol indicates a procedure for selecting a new IP address and a specific range of IP addresses from which to select the new IP address;
 program instructions to receive the new IP address from the address providing server
 program instructions to identify a lease time associated with the new IP address from the address provide server, wherein the new IP address is valid for a limited interval of time indicated by the lease time; and
 program instructions to apply the new IP address for the limited interval of time.

16. The system in accordance with claim 15, wherein the program instruction to request the new IP address further comprises:
 program instructions to instruct, by the processor, that the address providing server to drop a currently assigned IP address of the server;
 program instructions to instruct, by the processor, the address providing server to select the new IP address using the particular response protocol, wherein the new IP address is selected from the range of IP addresses associated with the particular response protocol, wherein receiving the new IP address from the address providing server comprises receiving the selected new IP address from the address providing server.

17. The system in accordance with claim 15, wherein the particular response protocol instructs the address providing server to select an IP address previously unassigned to the server as the new IP address.

18. The system in accordance with claim 15, wherein the particular response protocol instructs the address providing server to randomly select the new IP address from among a set of unassigned IP addresses.

19. The system in accordance with claim 15, wherein the particular response protocol instructs the address providing server to select the new IP address using a next available IP address in a predetermined ordered list of IP address.

20. The system in accordance with claim 15, wherein the particular response protocol instructs the address providing server to select a least recently used IP address as the new IP address.

* * * * *